United States Patent
Klinicki (10) Patent No.: US 9,585,312 B1
(45) Date of Patent: Mar. 7, 2017

(54) TAPERED, VERTICAL, INTERLOCKING PLANTER APPARATUS AND METHOD

(71) Applicant: Michael Anthony Klinicki, Vail, AZ (US)

(72) Inventor: Michael Anthony Klinicki, Vail, AZ (US)

(*) Notice: Subject to any disclaimer, the term of this patent is extended or adjusted under 35 U.S.C. 154(b) by 0 days.

(21) Appl. No.: 14/625,191

(22) Filed: Feb. 18, 2015

(51) Int. Cl.
*A01G 9/02* (2006.01)
*A01G 9/10* (2006.01)
*A47G 7/00* (2006.01)

(52) U.S. Cl.
CPC .............. *A01G 9/02* (2013.01); *A01G 9/104* (2013.01); *A47G 7/00* (2013.01)

(58) Field of Classification Search
CPC .......... A01G 9/00; A01G 9/022; A01G 9/023; A01G 9/104; A01G 2009/003; A47G 2007/066; A47G 7/00; A47G 7/02; A47G 7/025; A47G 7/041
See application file for complete search history.

(56) References Cited

U.S. PATENT DOCUMENTS

| | | | | |
|---|---|---|---|---|
| 297,932 A * | 4/1884 | Groves et al. | ......... | A01G 9/022 47/82 |
| 586,485 A * | 7/1897 | Guyn | ...................... | A01G 9/104 47/77 |
| 1,959,800 A * | 5/1934 | Rogge | .................... | A47G 7/041 16/42 R |
| 2,792,142 A * | 5/1957 | Sandkuhle | ............... | B65D 9/12 217/12 R |
| 3,137,096 A | 6/1964 | Hopkins | | |
| 4,349,864 A * | 9/1982 | Smith | ..................... | A01G 7/045 362/122 |
| 4,612,726 A * | 9/1986 | Mori | ......................... | A01G 9/00 47/17 |
| 5,347,751 A * | 9/1994 | Carpay | .................. | A47G 7/041 47/39 |
| 5,404,672 A | 4/1995 | Sanderson | | |
| 5,555,676 A | 9/1996 | Lund | | |
| 5,606,824 A | 3/1997 | Ruibal | | |
| 5,852,895 A | 12/1998 | Sinanan | | |
| 5,870,856 A * | 2/1999 | Friend | ...................... | A01G 9/02 47/65.7 |
| 7,832,147 B2 | 11/2010 | Weast | | |
| 8,070,327 B1 * | 12/2011 | Gallagher | ............... | F21S 6/004 362/125 |
| 8,453,379 B1 * | 6/2013 | Kumar | ...................... | A01G 9/02 47/39 |

(Continued)

FOREIGN PATENT DOCUMENTS

CN 201504445 U 6/2010

*Primary Examiner* — Tien Dinh
*Assistant Examiner* — Michael A Fabula (57) ABSTRACT

The apparatus provides a method for assembling a vertically oriented structure for plants and flowers. A planter assembly which accepts soil and plants is attached to a base assembly which supports the planter assembly. The attachment of the planter assembly to the base assembly is via a plurality of rigid panels inserted into slotted cavities on both the planter assembly and the base assembly wherein the panels are aligned and attached uniformly and directly adjacent to the outer surfaces of the planter assembly and the base assembly sides. When upright, the assembled structure descends in width from top to bottom.

8 Claims, 7 Drawing Sheets

(56) References Cited

U.S. PATENT DOCUMENTS

| | | |
|---|---|---|
| 8,635,808 B1 | 1/2014 | Anderson |
| 8,839,553 B2 | 9/2014 | Toro |
| 8,904,706 B1 | 12/2014 | Smith |
| 2005/0204621 A1* | 9/2005 | Garrison .................. A01G 9/02 47/66.1 |
| 2012/0080343 A1* | 4/2012 | Gretz ....................... A01G 9/02 206/423 |
| 2012/0174481 A1* | 7/2012 | Toro ......................... A01G 9/02 47/86 |
| 2014/0083009 A1* | 3/2014 | Panopoulos ............. A01G 9/02 47/62 R |

* cited by examiner

TAPERED, VERTICAL, INTERLOCKING PLANTER APPARATUS AND METHOD

CROSS-REFERENCE TO RELATED APPLICATIONS

Not applicable

BACKGROUND OF THE INVENTION

Plants and flowers are commonly grown to add beauty and appeal to a location. Frequently grown in decorative pots, potted plants and flowers often become the centerpiece of a space. The pots themselves can be highly artistic in design and in finish, and are available in a wide range of sizes and materials. Typical sizes can range from a few inches in height and width to several feet. Plastic, metal, clay and ceramic are common materials used to make decorative pots. One particularly popular design is a tall and narrow shaped pot which gives the pot a column-like appearance. This style is popular for several reasons including having the benefit of elevating plants and flowers off the ground resulting in an aesthetically pleasing display. Elevating plants brings them closer to eye-level, making viewing easier, and can make care and watering easier.

While tall, vertical pots are popular they tend to be relatively expensive and can be cost -prohibitive to many consumers. Highly decorative pots are particularly expensive and consumers are limited in their selection of finishes and heights. Tall pots also require a relatively large amount of soil to fill their planting cavities. In many cases the soil at the bottom of the pot goes unused by the planted vegetation resulting in wasted material. The unused soil also adds unnecessary weight to the pot. The present apparatus provides a unique means for construction of a tall, vertically-oriented pot which allows for a wide range of finishes and heights. Finishes can include, but are not limited to, natural wood, stained wood, painted wood, masonry, stucco, tile, and metal. The apparatus allows for the height of the pot to be customized during construction as well as significantly reducing the amount of soil required by the pot compared to traditional pots of similar height.

SUMMARY OF THE INVENTION

A vertical, interlocking planter apparatus, the purpose of which is to provide a convenient method for assembling a column-shaped, vertically-oriented structure for plants and flowers. To attain this, the planter system provides a planter assembly which accepts soil and plants, a base assembly which supports the planter assembly, and a method for joining the two pieces in a vertically-oriented configuration.

An object of the vertical, interlocking planter apparatus is to provide for customized heights of potted plants and flowers.

A further object of the vertical, interlocking planter apparatus is to provide for a reduction in the amount of needed planting material, such as soil, for potted plants and flowers.

And, an object of the vertical, interlocking planter apparatus is to provide for customization of the planter's finished appearance.

DETAILED DESCRIPTION

With reference now to the drawings, and in-particular FIGS. 1 through 15 thereof, the principles and concepts of the interlocking planter system generally designated by the reference number 70 will be described.

Figure 15:
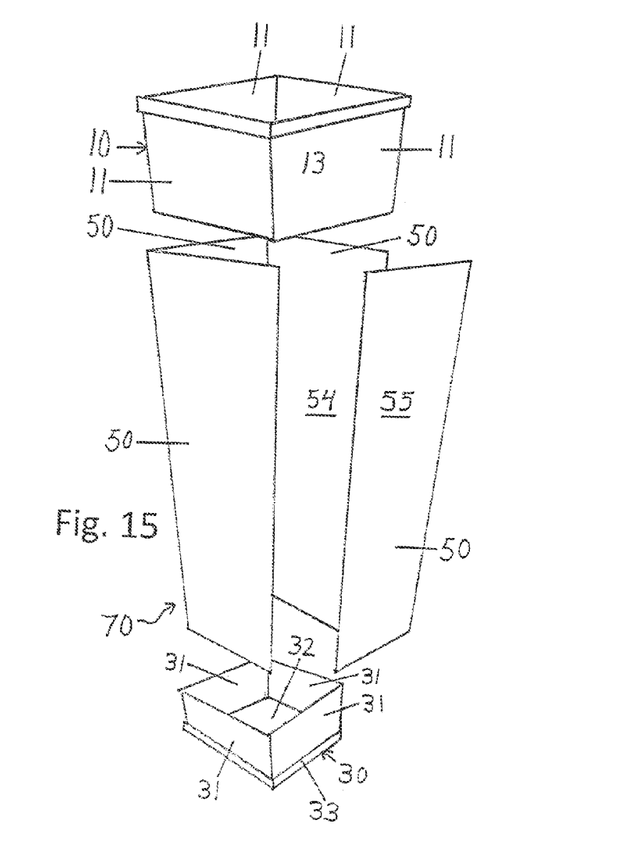
FIG. 15 is an exploded view of the planter assembly, base assembly, and rigid support panels.

Referring to FIG. 15, the planter system is shown in an exploded view which reveals several key components and generally shows their locations during assembly. A planter assembly 10 is made of plastic, fiberglass or metal and is generally "box" shaped with an open top. The planter assembly allows plants and flowers to be planted inside the assembly. A base assembly 30 is made of plastic, fiberglass or metal and is generally "box" shaped with an open top. The base assembly provides a stable foundation for the planter system to sit upon. Rigid support panels 50 are made of generally planar material including, but not limited to, plywood, sheet metal, concrete "backer" board, plastic, or fiberglass. The rigid support panels 50 are used to connect the planter assembly 10 to the base assembly 30.

Figure 1:
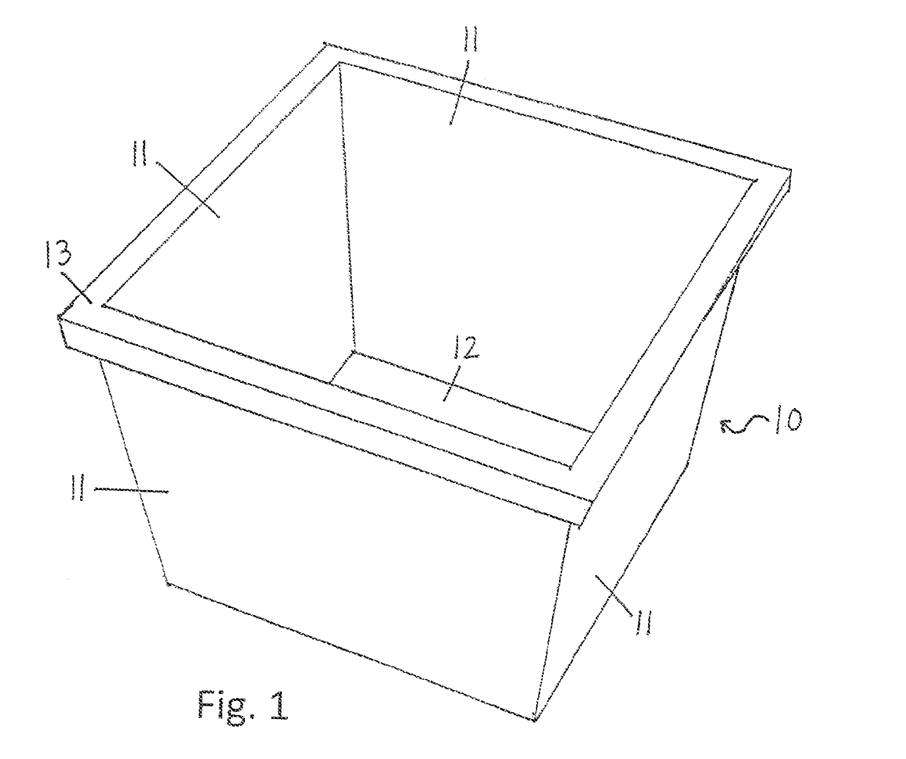
FIG. 1 is a perspective view of the planter assembly.

FIG. 1 shows the details of the planter assembly 10. The planter assembly has a selected number of sides 11, a bottom 12, and a rim 13 around the outer, upper edge of the sides.

Figure 2:
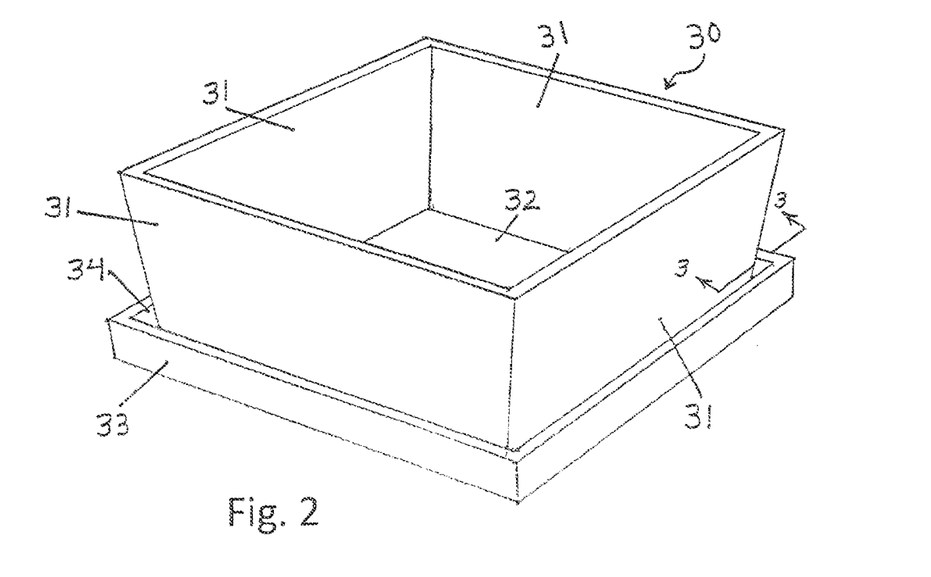
FIG. 2 is a perspective view of the base assembly.

FIG. 2 shows the details of the base assembly 30. The base assembly has the same number of sides 31 as the planter assembly 10, a bottom 32, and a rim 33 around the outer, lower edge of the sides.

Figures 3, 4:
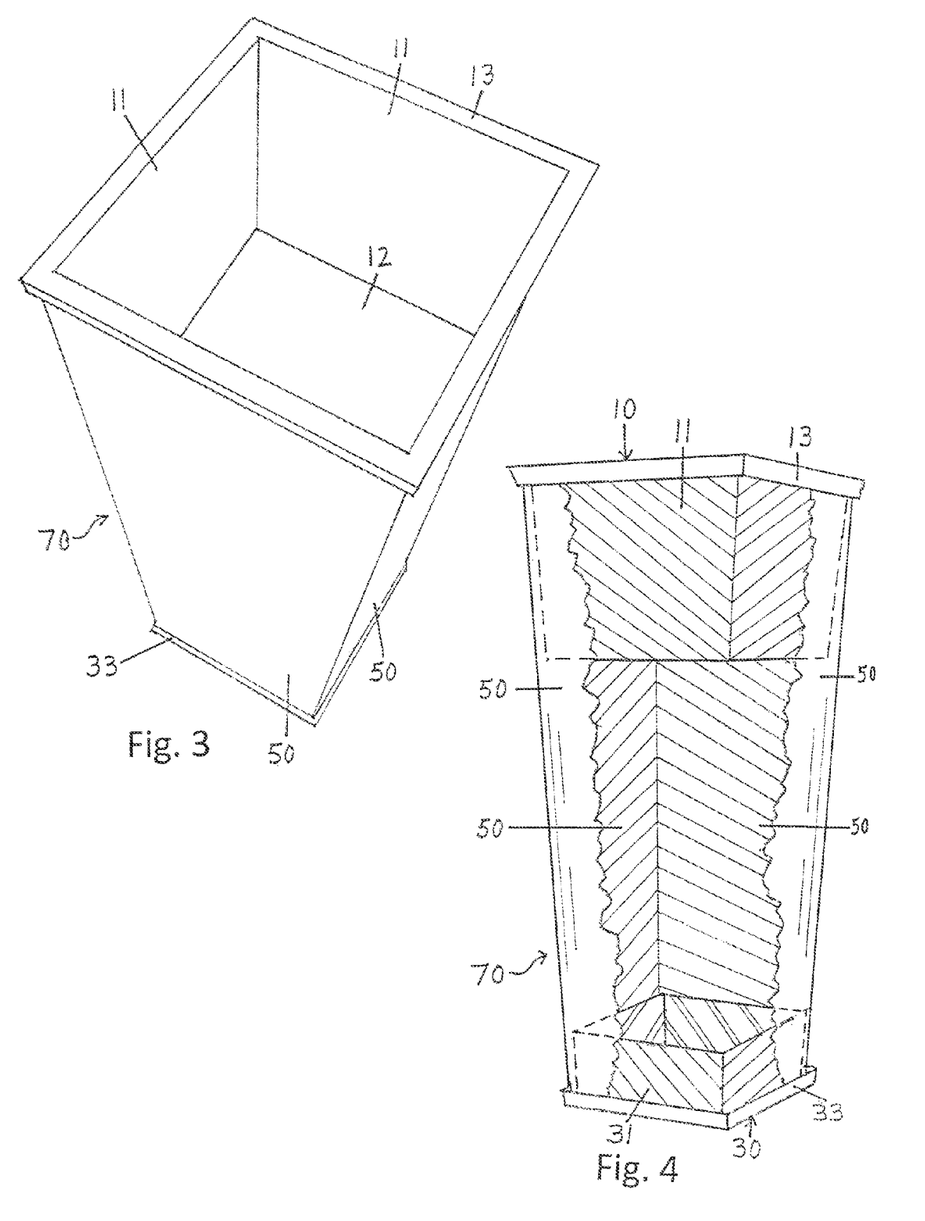
FIG. 3 is a perspective view of the planter assembly presently assembled with the base assembly joined by rigid support panels.
FIG. 4 is a cut-away side view of the planter assembly presently assembled with the base assembly joined by rigid support panels.

Both the planter assembly's rim 13 and the base assembly's rim 33 have cavities that run horizontally along their surfaces. The planter assembly's cavity 14 (FIG. 9) is on the bottom of its rim. The base assembly's cavity 34 (FIG. 2) is on the top of its rim. The cavities allow for connecting the two assemblies with a predetermined number of rigid support panels 50 (FIG. 3). During assembly, the rigid support panels are inserted into the cavities. The cavities align the panels, which in turn align the planter assembly 10 with the base assembly 30.

FIG. 3 shows the rigid support panels 50 supporting the planter assembly directly above the base assembly. The planter assembly rim 13 and the base assembly rim 33 are visible.

FIG. 4 is a cut-a-way view of the assembled interlocking planter system 70. The planter assembly 10 is show aligned directly above the base assembly 30 by the rigid support panels 50. The rigid support panels join the planter assembly 10 at the planter assembly rim 13 and with the base assembly 30 at the base assembly rim 33. The rigid support panels 50 run generally parallel with the planter assembly sides 11 and the base assembly sides 31.

Figure 5:
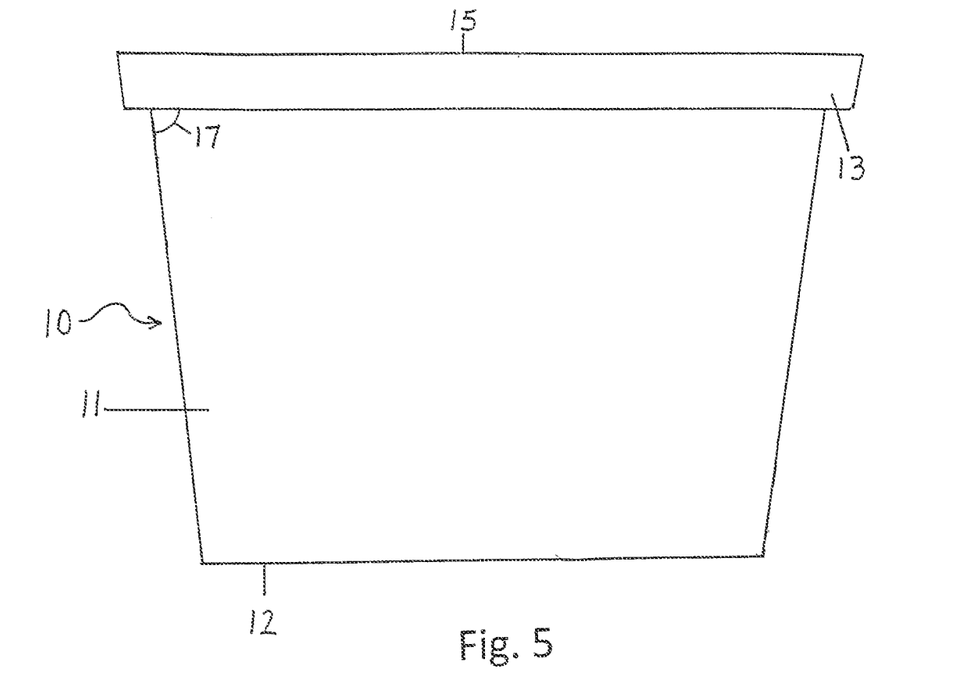
FIG. 5 is an orthogonal side view of the planter assembly.

FIG. 5 is a side view of the planter assembly 10. The planter assembly walls 11 connect the planter assembly rim 13 with the planter assembly bottom 12. The angle 17 at which the planter assembly walls join the planter assembly rim is predetermined and is between forty-five degrees and ninety degrees. The planter assembly rim 13 and top edge 15 are parallel with the planter assembly bottom 12.

Figure 6:
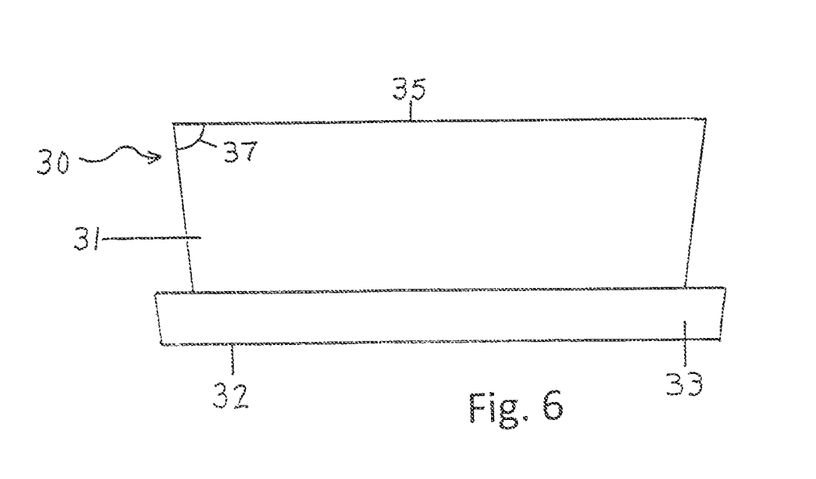
FIG. 6 is an orthogonal side view of the base assembly.

FIG. 6 is a side view of the base assembly 30. The base assembly walls 31 are connected to the base assembly rim 33 and the base assembly bottom 32. The base assembly top edge 35 is parallel with the base assembly rim 33 and the base assembly bottom 32. The angle 37 at which the base assembly walls meet the plane of the base assembly top edge 35 is approximately the same number of degrees as angle 17 (FIG. 5) of the planter assembly walls.

Figures 7, 8:
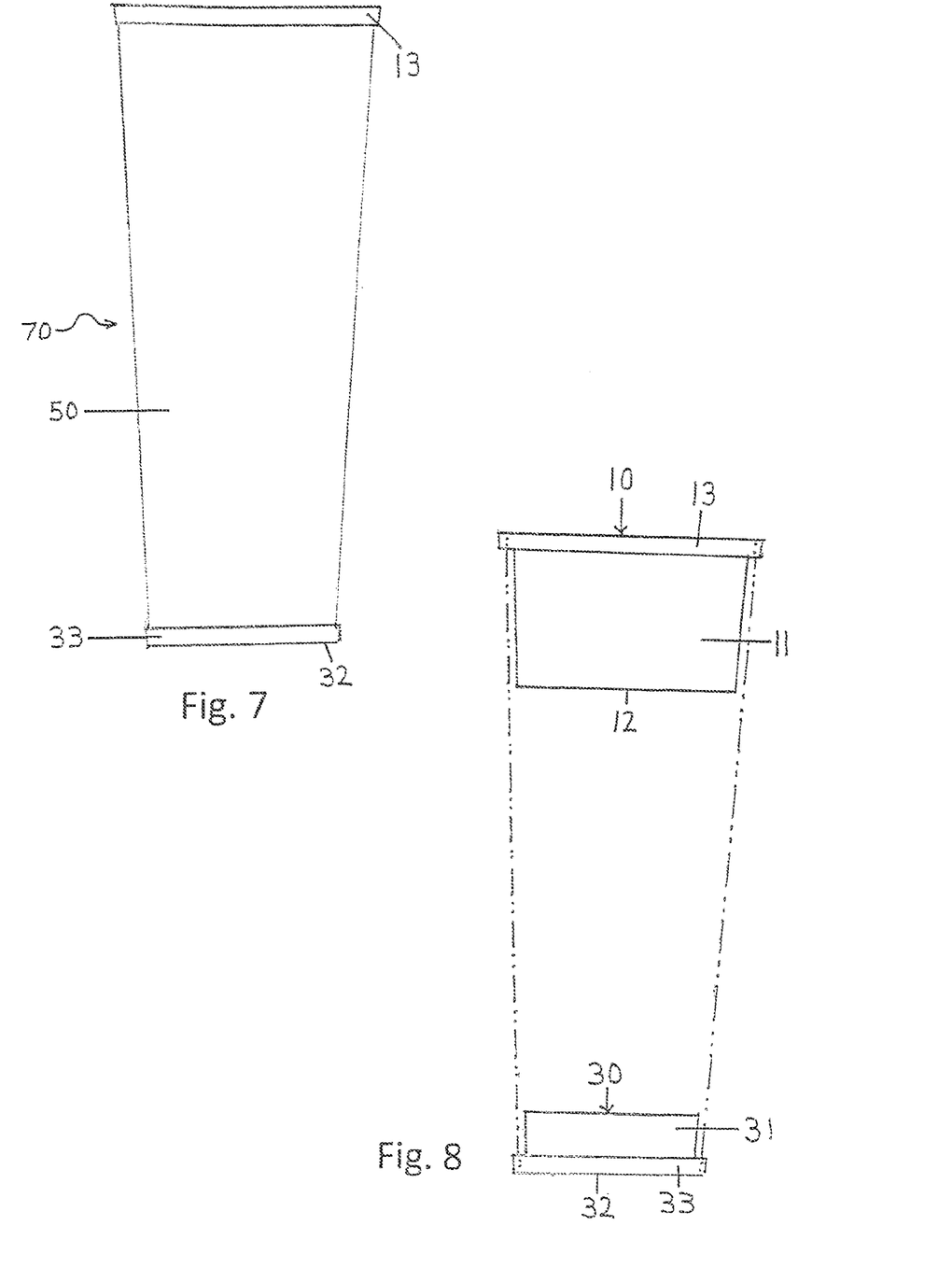
FIG. 7 is an orthogonal side view of the planter assembly presently assembled with the base assembly joined by rigid support panels.
FIG. 8 is an orthogonal side view of the planter assembly and the base assembly with rigid support panels represented in phantom format.

FIG. 7 is a side view of the assembled interlocking planter system 70.

FIG. 8 shows the positioning of the planter assembly 10 directly above the base assembly 30. Phantom lines simulate the position of the rigid support panels.

Figure 9:
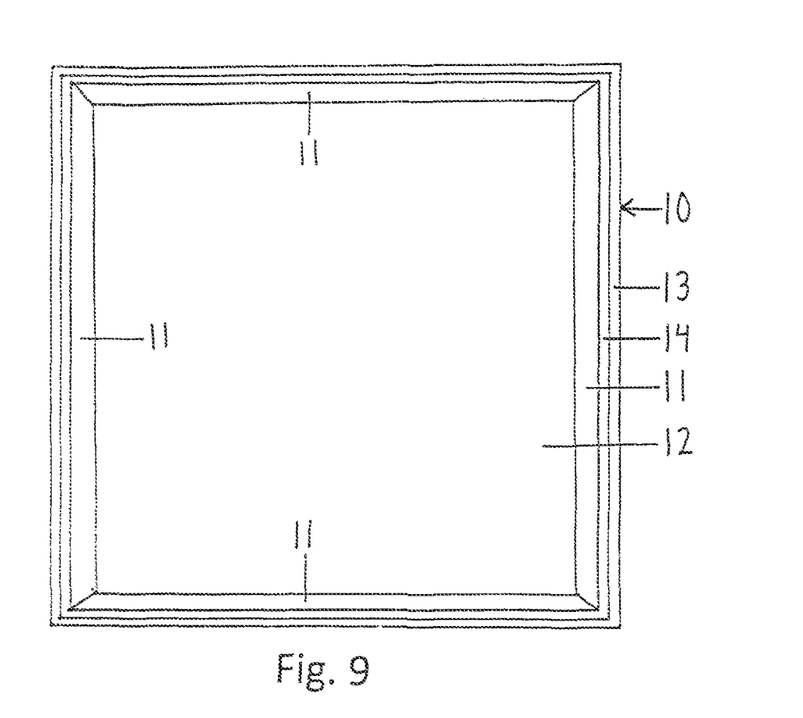
FIG. 9 is an orthogonal bottom view of the planter assembly.

FIG. 9 shows a bottom view of the planter assembly 10. The planter assembly is a polygon shaped and has a select number of sides 11. The planter assembly bottom 12 is joined with, and held in position by, the planter assembly walls 11. A rim 13 extends around the perimeter of the planter assembly along the upper edge of the walls 11. Between the rim 13 and the walls 11 is a cavity 14.

Figure 10:
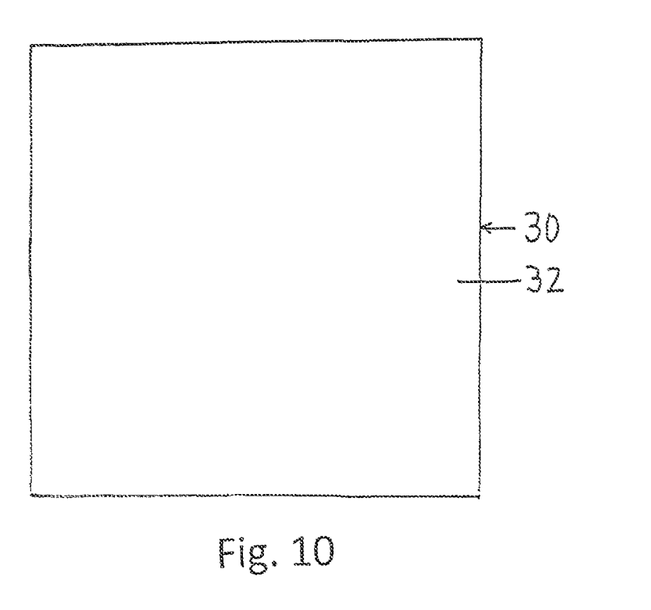
FIG. 10 is an orthogonal bottom view of the base assembly.

FIG. 10 shows a bottom view of the base assembly 30. The base assembly 30 has a bottom 32 that is generally flat and provides a stable surface for the assembled interlocking planter system to rest upon.

Figure 11:
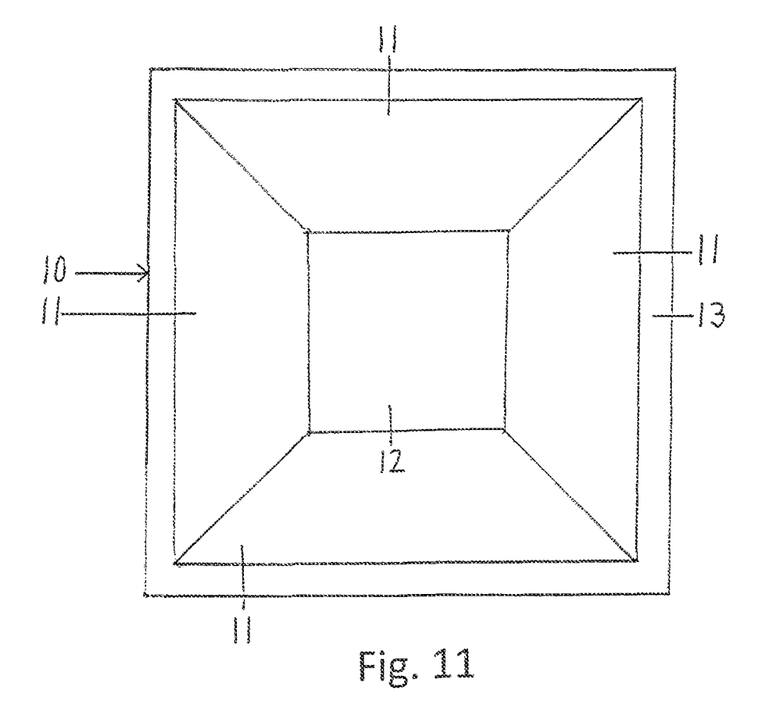
FIG. 11 is an orthogonal top view of the planter assembly.

FIG. 11 shows a top view of the planter assembly 10. Visible in this view is the hollow interior of the planter assembly formed by the sides 11, rim 13, and bottom 12. The hollow interior is used to hold soil and plants.

Figure 12:
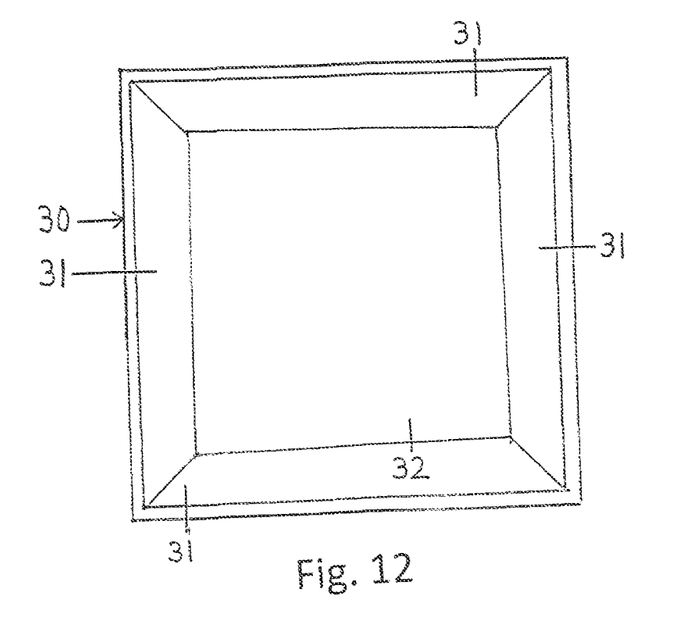
FIG. 12 is an orthogonal top view of the base assembly.

FIG. 12 shows a top view of the base assembly 30. Visible in this view are the walls 31 and bottom 32.

Figure 13:
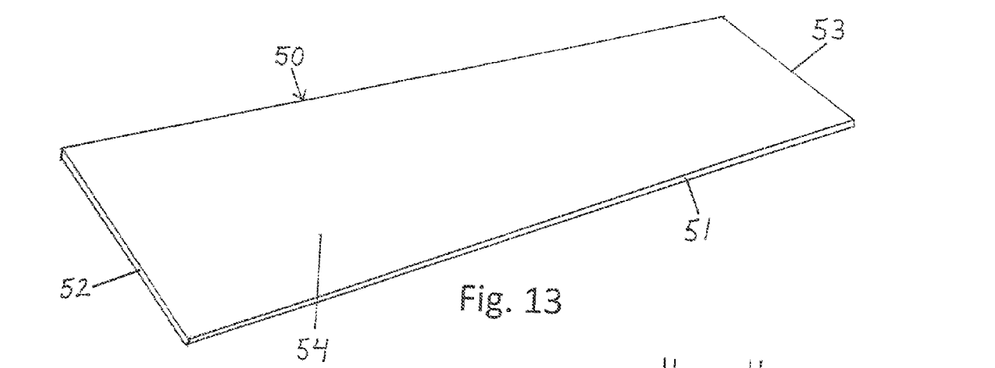
FIG. 13 is a perspective view of a sample rigid support panel.

FIG. 13 shows a sample rigid support panel 50. The rigid support panel consists of a top edge 52, a bottom edge 53, interior surface 54, and exterior surface (not shown). The rigid support panel is generally planar in shape. A plurality of panels is used to connect the planter assembly 10 to the base assembly 30. When assembled, the side edge 51 of each panel 50 will be adjacent to a corresponding side edge of another panel. The support panels may be attached to each other along their corresponding side edges with anchors or adhesive (not shown). The panel's exterior surface allows for customization via applied decorative embellishments (not shown).

Figure 14:
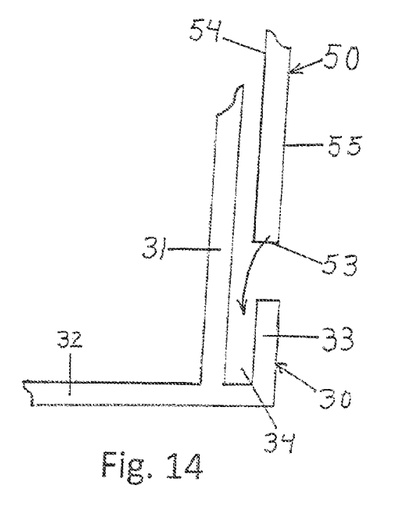
FIG. 14 is a detailed cross-sectional view of FIG. 2, taken along the line 3-3, with a representation of the insertion and assembly motion of a rigid support panel.

FIG. 14 is a detailed cross sectional view of FIG. 2, taken along the line 3-3, with a representation of the insertion and assembly motion of a rigid support panel. This view shows details of each piece and how the rigid support panel 50 is inserted into the cavity 34 of the base assembly 30. The cavity is formed by the base assembly's bottom 32, walls 31, and rim 33. When the bottom edge 53 of the rigid support panel is inserted into the cavity of the base assembly 30, the interior surface 54 of the rigid support panel 50 is in contact with the surface of the base assembly side 31 and the exterior surface 55 of the rigid support panel faces outward. Adhesive such as glue (not shown), or anchors such as screws (not shown) can be used to secure the rigid support panel 50 in the cavity 34. The process is similar when inserting the top edge 52 of the rigid support panel 50 into the cavity 14 (FIG. 9) of the planter assembly 10, however the planter assembly's cavity 14 is downward-facing, therefore the top edge 52 of the rigid support panel would move upward into the cavity 14.

FIG. 15 shows an exploded view of the planter assembly 10, base assembly 30, and rigid support panels 50. The planter assembly 10 is positioned at the top, the rigid support panels 50 are positioned in the middle, and the base assembly 30 is positioned at the bottom. FIG. 15 illustrates the interlocking planter system 70 in a four-sided configuration.

Those skilled in the art will be aware of materials, techniques and equipment suitable to produce the example embodiments presented as well as variations on those examples. This teaching is presented for purposes of illustration and description but is not intended to be exhaustive or limiting to the forms disclosed. Many modifications and variations will be apparent to those of ordinary skill in the art. The embodiments and versions help to explain the principles of the invention, the practical application, and to enable others of ordinary skill in the art to understand it. Various embodiments with various modifications as are suited to the particular application contemplated are expected.

I claim:

1. An interlocking planter system comprising:
   a. a planter assembly having a polygonal shape comprising:
      a selected number of sides and a same selected number of corners,
      a bottom surface extending in a plane,
      wherein a lower edge of each side joins to the bottom surface at an outer edge of said bottom surface,
      a rim along an upper and outer edge of said sides,
      wherein said rim is parallel to said bottom surface,
      a cavity on a bottom of said rim which faces downwardly and is configured to receive, align and engage a sheet of rigid material,
      wherein said sides and said bottom surface form an enclosure having a hollow interior and an open top,
      wherein said enclosure is adapted to receive and retain an amount of soil fill for cultivating vegetation;
   b. a base assembly having a polygonal shape comprising:
      a selected number of sides and a same selected number of corners as the planter assembly,
      a bottom surface extending in a plane,
      wherein a lower edge of each side joins to the bottom surface at an outer edge of said bottom surface,
      a rim along the lower and outer edge of said sides and adjacent to said bottom surface,
      wherein an upper edge of each side is parallel to said bottom surface,
      a cavity on a top of said rim which faces upwardly and is configured to receive, align and engage a sheet of rigid material; and
   c. a selected number of sheets of rigid material equal to the number of sides of the planter assembly and the base assembly;

wherein the planter assembly is attached vertically above the base assembly by the sheets of rigid material inserted into the cavity of the planter assembly and the cavity of the base assembly, wherein the outer surfaces of the sides of the planter assembly and the base assembly, upon being assembled, are adjacent to inside surfaces of the sheets of rigid material and provide contact along the entirety of the outer surfaces of each assembly for anchoring the planter and base assemblies to the sheets of rigid material.

2. The planter system of claim 1 wherein the selected number of sides of the planter assembly is three, four, five, six, seven, eight, nine, or ten.

3. The planter system of claim 1 wherein the planter assembly and the base assembly have approximately the same polygon shape.

4. The planter system of claim 1 wherein the perimeter dimension of said sides of the planter assembly and the perimeter dimension of said sides of the base assembly differ by a percentage greater than five and no more than fifty.

5. The planter system of claim 1 wherein the planter assembly and the base assembly are formed from plastic, fiberglass, concrete, wood, or metal.

6. The planter system of claim 1, wherein a first angle (17) measured between the rim and each respective side of the planter assembly and a second angle (37) measured between a top edge and each adjacent side of the base assembly are both approximately the same angle.

7. The planter system of claim 1, wherein a first angle (17) measured between the rim and each respective side of the planter assembly and a second angle (37) measured between a top edge and each adjacent side of the base assembly are both between forty-five and eighty-five degrees.

8. The planter system of claim 1, wherein the perimeter dimension of the sides of the planter assembly is greater than the perimeter dimension of the sides of the base assembly.

\* \* \* \* \*